(12) United States Patent
Johnson, Jr.

(10) Patent No.: US 6,290,238 B1
(45) Date of Patent: Sep. 18, 2001

(54) GASKET FOR USE WITH AN AIR BRAKE HOSE COUPLING MEMBER

(75) Inventor: Theodore C. Johnson, Jr., Solon, OH (US)

(73) Assignee: New York Air Brake Corporation, Watertown, NY (US)

(*) Notice: Subject to any disclaimer, the term of this patent is extended or adjusted under 35 U.S.C. 154(b) by 0 days.

(21) Appl. No.: 09/504,102

(22) Filed: Feb. 14, 2000

Related U.S. Application Data

(63) Continuation of application No. 08/754,215, filed on Nov. 20, 1996, now Pat. No. 6,024,363.
(60) Provisional application No. 60/027,056, filed on Sep. 30, 1996.

(51) Int. Cl.$^7$ ............................................. F16L 17/06
(52) U.S. Cl. ................................. 277/613; 277/626
(58) Field of Search .................................. 277/602, 613, 277/915, 944, 609, 612, 615, 616, 626, 641, 642, 647; 285/65, 2.2

(56) References Cited

U.S. PATENT DOCUMENTS

| | | |
|---|---|---|
| 439,902 | 11/1890 | Sharon . |
| 509,114 | 11/1893 | Beery . |
| 1,065,515 | 6/1913 | Ewert . |
| 1,317,535 | 9/1919 | Wilson . |
| 1,558,601 | 10/1925 | Farmer . |
| 3,016,254 | 1/1962 | Holdeman . |
| 3,346,263 | 10/1967 | Newcomer . |
| 3,879,066 | 4/1975 | Kozinski . |
| 4,072,245 | 2/1978 | Sloan, Jr. . |
| 5,240,311 | 8/1993 | Bunker . |
| 5,286,064 | 2/1994 | Bridges . |
| 5,388,864 | 2/1995 | Kozinski . |

FOREIGN PATENT DOCUMENTS

23148/29 10/1929 (AU) .

*Primary Examiner*—Anthony Knight
*Assistant Examiner*—Matthew E. Rodgers
(74) *Attorney, Agent, or Firm*—Barnes & Thornburg

(57) ABSTRACT

The gasket is for use in detachably connecting two similar coupling members on the ends of air brake hoses for railroad cars to form an airtight connection. The gasket provides a ramped entrance angle and a wide sealing surface for providing better alignment and sealing during coupling with another similar member.

7 Claims, 2 Drawing Sheets

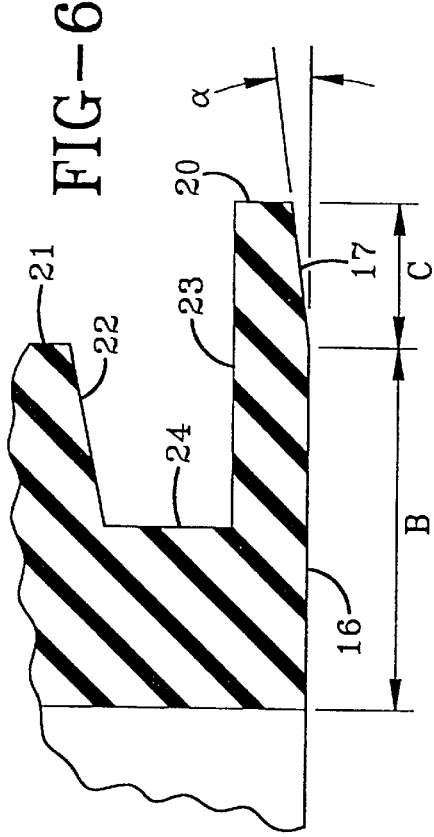
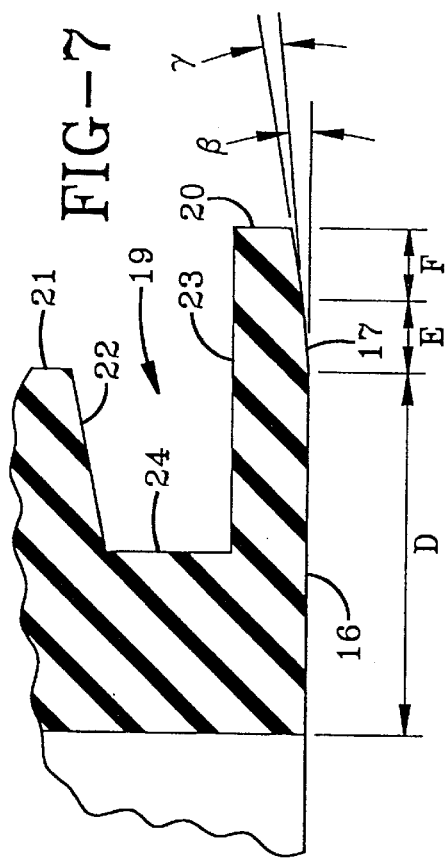
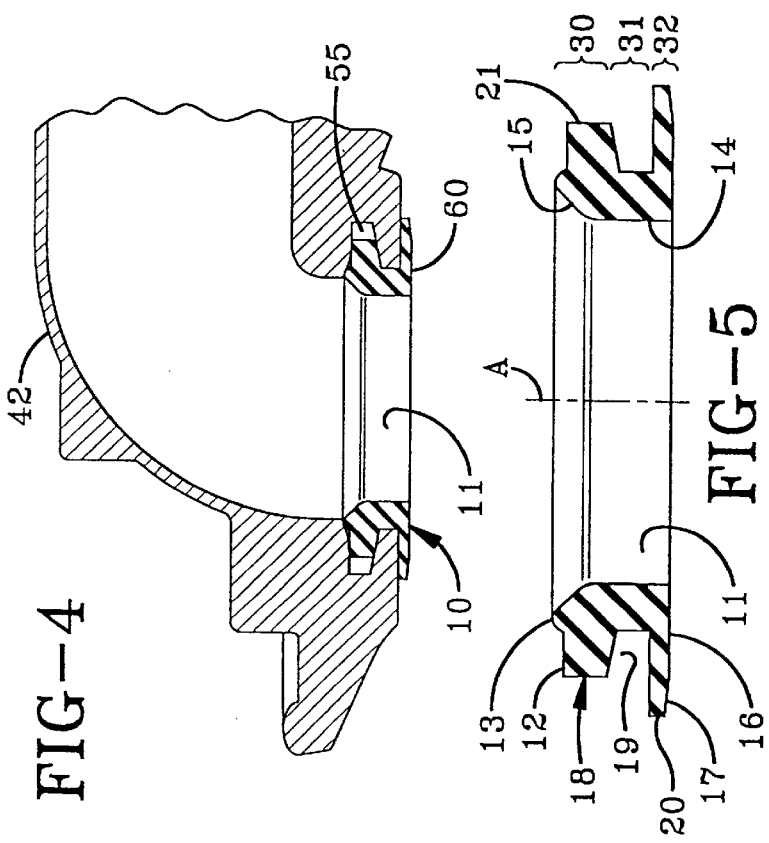
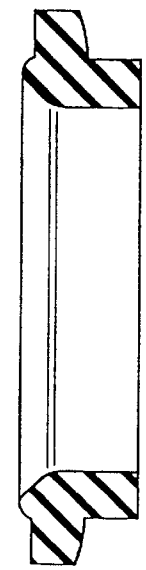

GASKET FOR USE WITH AN AIR BRAKE HOSE COUPLING MEMBER

CROSS REFERENCE TO RELATED APPLICATION

This is a Continuation of application Ser. No. U.S. Pat. No. 08/754,215, filed Nov. 20, 1996 now U.S. Pat. No. 6,024,363.

This application claims priority from pending provisional application Ser. No. 60/027,056 filed on Sep. 30, 1996.

BACKGROUND OF THE INVENTION

1. Technical Field

The invention relates to a gasket for use in detachably connecting two similar coupling members on the ends of air brake hoses for railroad cars to form an airtight connection. More particularly, the invention relates to an improved air brake hose coupling member having improved sealing means that provide better alignment and sealing during coupling with a similar member on an adjacent railroad car. Specifically, the invention relates to an improved gasket incorporating a ramped entrance angle and a wide sealing surface for providing better alignment and sealing during coupling with another similar member.

2. Background Information

Railroad cars having pneumatic brake systems use flexible air hoses which extend the length of the train by spanning between separate yet adjacent railroad cars. Typically, at least one flexible hose extends from the front to the back of a railroad car with a fluid connection branching off to the emergency brake system midway therebetween. A coupling member is attached to each end of each flexible hose for detachably connecting the hose sections of adjacent cars together when individual railroad cars are joined to form a unit train. These coupling members whether connected to another or not, are suspended from the end of the car and hang a short distance above the ground or railroad tracks. Overall, these couplings are designed and manufactured to meet the requirements of the Association of American Railroads and are generally similar, so as to be compatible and interchangeable with those of other manufacturers.

As is well known in the art, these couplings are joined together by pulling the hoses from adjacent cars upward, pushing the sealing gaskets on the coupling members at the end of each hose into aligned and abutting relationship, and then rotating the coupling members downward which interengages mating flanges and lugs extending from the coupling members. If properly performed, this results in a sealed fluid passage between air hoses on adjacent railroad cars whereby the air pressure in the hose lines maintains the brakes of all of the individual cars in an "off" position. Any significant reduction in air pressure within these hose lines actuates the brakes in all of the individual cars to an "on" or braking position. If the train were to derail, or cars were to accidentally separate, or if for any other reason the air was to leak resulting in decreased pressure then all of the cars go into this braking position. Thus, accidental separation of the coupling between two sections of air hose will apply the emergency car brakes, resulting in sudden stopping of a train with the subsequent delay, inconvenience and expense as well as chance of accidents, and therefor any accidental disconnection of the couplings needs to be avoided, Clearly, each connection of adjacent coupling members is critical since only one leak stops the entire train. However in operation, the couplings are often difficult to properly align. Improper alignment often either results in an ineffective (leaky) seal or no seal at all. However, in many cases the tolerances in the couplings allow the downward rotational motion locking anyway even though the coupling members are misaligned. When two coupling members are misaligned yet locked, the connection may or may not seal. When sealing does not occur, the brakes do not release thereby prohibiting movement of the train. These locked brakes force a brakeman to inspect the connections to find the unsealed connection, which once found can then be relocked in hopefully an aligned manner. This inspection and relocking is a time consuming event. In addition, the brakeman may find that the seal has been damaged. In this case, the seal must also be replaced prior to relocking.

An even more drastic scenario is where the misaligned coupling members improperly seal. In this case, the improper seal may hold the pneumatic pressure for awhile or until sufficiently jarred such as during standard operation. If the seal is not capable of holding standard operational pressures of 60 to 90 p.s.i., and the seal fails during operation then undesirable emergency braking occurs which stops the train. The failed coupling must be found, fixed or replaced, and recoupled before the train can move. This is again a time consuming event.

In addition, even when alignment is proper, the sealing surfaces of the gasket must be able to withstand upwards of 90 p.s.i. during operation. As is well known in the art, the seal must be sufficient to hold this pressure while not inhibiting the coupling member's ability to separate along the hose axis during a standard disconnect. Current seal designs sometimes fail in holding the pneumatic pressure resulting in these seals leaking either slowly or rapidly which releases the pneumatic pressure which causes emergency brake activation.

Thus, a current problem exists surrounding alignment of the gaskets of two adjacent coupling members which only if aligned seal properly and allow for proper connection and separation. In sum, it has been found that standard prior art gaskets such as that shown in FIG. 8 are not conducive to proper alignment and engagement as is required for necessary sealing of coupled air brake hose coupling members at the standard air brake pressures of between 60 p.s.i. and 90 p.s.i. Overall, improper alignment of the gaskets causes poor or ineffective sealing due to gasket misalignment which results in a higher likelihood of uncoupling of air hose couplings due to misalignment of the gaskets, or poor sealing both of which result in too little pull apart resistance whereby said lack of separation resistance causes the air hose couplings to fall apart which immediately throws the entire train into an emergency brake application. All of this results in added costs and time, both of which are undesirable.

Thus, a need has existed for an improved air brake hose coupling member which enables rapid connection of hose sections in the heretofore usual manner without additional manipulations being required, which does not affect the usual rotational connection, separation and operation of such coupling members, and which does not affect the usual axial separation and operation of such coupling members while preventing or considerably reducing premature uncoupling of the attached members in an axial manner due to improper gasket alignment and/or poor sealing.

OBJECTIVES AND SUMMARY OF THE INVENTION

Objectives of the invention include providing an improved air brake hose coupling member which meets the requirements of the Association of American Railroads or Society of Automotive Engineers and which is compatible or interchangeable with existing coupling members being used.

It is a further object of the invention to provide an improved air brake hose coupling member having a gasket that properly aligns with a corresponding gasket on a corresponding coupling member when coupled together.

A still further objective is to provide such an improved air brake hose coupling member having a gasket with ramped, rounded, beveled or otherwise reduced corner or entrance angles for allowing easier interaction between corresponding gaskets when adjacent coupling members are coupled.

Another objective of the invention is to provide an improved air brake hose coupling member that is designed to prohibit the air hose couplings from coming apart until sufficient force is supplied to disengage the gaskets where the gaskets in the improved invention supply sufficient pull apart resistance thereby prohibiting accidental pull apart which causes the air hose couplings to fall apart thereby immediately throwing the entire train into an emergency brake application.

A further objective is to provide an enlarged surface area on the gaskets of air hose couplings so as to significantly increase the pull apart resistance.

Still other advantages and benefits of the invention will become apparent to those skilled in the art upon a reading and understanding of the following summary and detailed description.

Accordingly, the present invention satisfies these and other objects. Specifically, the present invention relates to an improved gasket for use with an air brake hose coupling member.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 4 is an enlarged fragmentary sectional view of the coupling of FIG. 2;

FIG. 5 is an enlarged sectional view of the gasket of FIG. 1;

FIG. 6 is a further enlarged fragmentary sectional view of a portion of the gasket of FIG. 5;

FIG. 7 is a fragmentary sectional view similar to FIG. 6 of a modified embodiment of the gasket; and FIG. 8 is an enlarged sectional view of a prior art gasket.

Similar numerals refer to similar parts throughout the drawings.

DESCRIPTION OF THE PREFERRED EMBODIMENT

Figure 1:
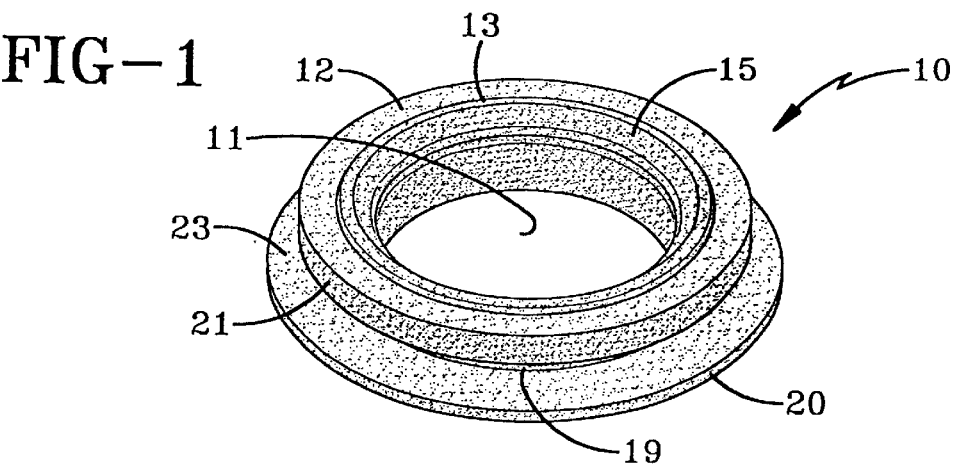
FIG. 1 is a perspective view of the improved gasket construction.
Figure 2:
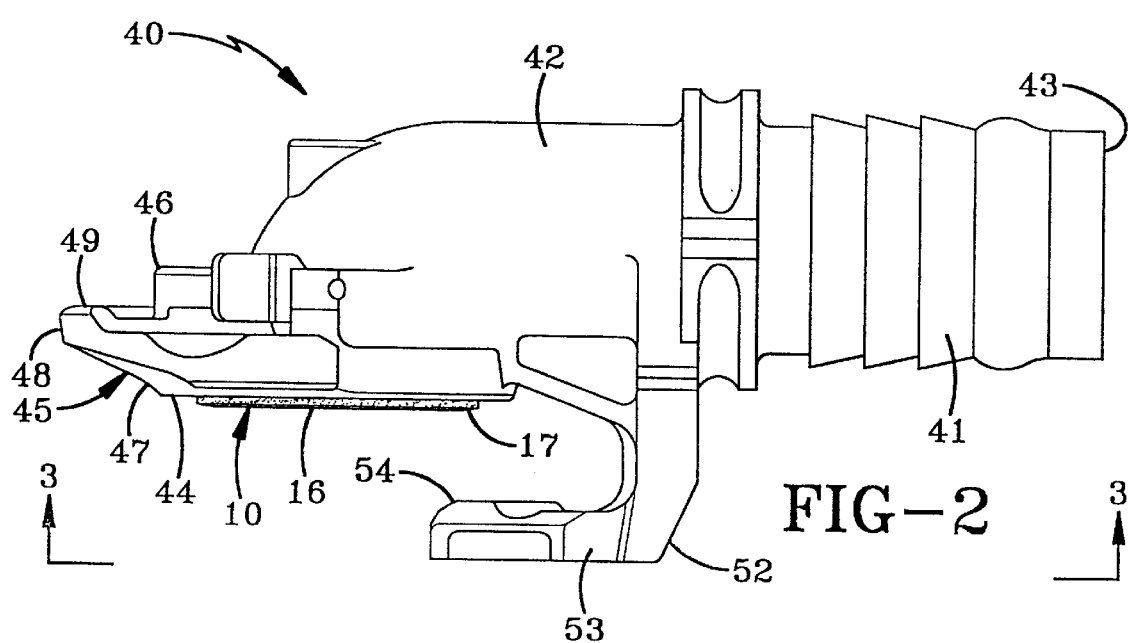
FIG. 2 is a side elevation view of the improved gasket of FIG. 1 mounted in an end coupling of an air brake hose.
Figure 3:
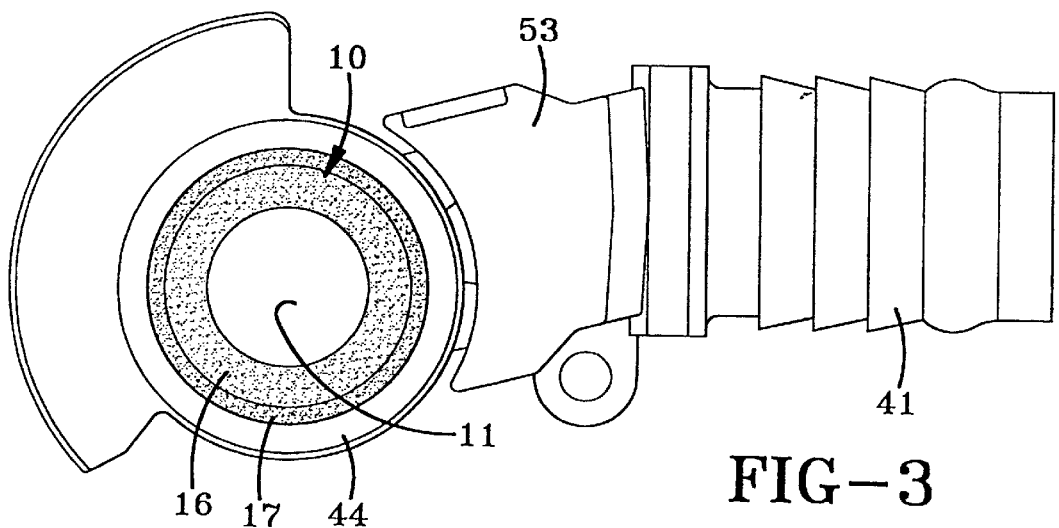
FIG. 3 is a plan view looking in the direction of Arrows 3—3, FIG. 2.

The improved gasket for use with an air brake hose coupling member of the present invention is indicated generally at 10, and is best shown in FIGS. 1, 4 and 5, and its environment is best shown in FIGS. 2–4. In use, two coupling members are coupled together to form a closed air passageway from one member to the other thereby coupling hoses in series as is well known in the art. The coupling member may be any of the air brake coupling members known in the art, all of which are similar in most respects to the coupling members shown in U.S. Pat. Nos. 3,879,066 and 5,388,864, the contents of which are incorporated herein by reference, except that the present invention has the improved gasket described below, which replaces the gaskets of these prior air coupling members.

The preferred embodiment of gasket 10 of the present invention, as is best shown in FIGS. 1 and 5, and in enlarged detail in FIG. 6 and in enlarged detail with slight modification in FIG. 7, is a one-piece molded polymer that is generally ringshaped with a hole 11 therein. Specifically, ring-shaped gasket 10 has a top surface 12, a lip 13 extending upward from top surface 12, an annular inner surface 14, an angled or beveled edge 15 extending from lip 13 to inner surface 14, a bottom surface 16, a ramped or beveled edge 17 extending in a flared or rounded fashion from bottom surface 16, and an annular outer surface 18 with an annular groove 19 molded therein. Annular outer surface 18 specifically includes lower annular outer surface 20 and upper annular outer surface 21, while groove 19 includes upper side wall 22, lower side wall 23, and a base 24.

The configuration of gasket 10 as described above defines three major parts of the gasket, namely a head 30, a neck 31, and a flange 32. Specifically, gasket 10 is configured with cylindrical neck 31 having one beveled edge 15 and with two outward radial projections in head 30 and flange 32.

In design, gasket 10 is preferably molded such that top surface 12, lower side wall 23, bottom surface 16, upper annular outer surface 21, lower annular outer surface 20, base 24, and annular inner surface 14 are each substantially planar. Top surface 12, lower side wall 23, and bottom surface 16 are in parallel planes, and similarly, upper annular outer surface 21, lower annular outer surface 20, base 24, and annular inner surface 14 are each in planes parallel to each other. In contrast, lip 13 rises from planar top surface 12 and meets with beveled edge 15. Beveled edge 15 extends from lip 13 to annular inner surface 14 in a conical manner with respect to a center axis extending through hole 11 in gasket 10 and around which the gasket is uniformly formed. In addition, upper side wall 22 is preferably not planar with lower side wall 23 and instead slopes closer to lower side wall 23 as upper side wall 22 extends radially inward toward central axis A. Ramped edge 17 is also not planar with bottom surface 16 and instead slopes closer to groove 19 as the ramped edge 17 extends radially outward toward the central axis A resulting in a flange 32 of reduced thickness at its outermost edge.

In accordance with the present invention, the novel and critical features of gasket 10 include (1) formation of this flange 32 by extending the bottom surface 16 out beyond the neck 31 as shown in FIG. 5 rather than having the bottom surface end at neck 31 as shown in the prior art of FIG. 8, and (2) angling of an outermost portion of the flange 32 to form this ramped edge 17 as shown in FIG. 5. The flange 32 defines a large bottom surface thereby supplying significantly improved holding of gaskets in compression when abutted in a locked relationship during use as described below. Flange 32 extends out from neck 31, and preferentially extends out from neck 31 to outer surface 21 of head 30 as indicated by distance B in FIG. 6 or distance D in FIG. 7, or beyond outer surface 21 as is shown by distance B plus C in FIG. 6 or distance D plus E plus F in FIG. 7.

In addition to adding flange 32, the gasket also includes the ramped edge 17 which supplies a nonbinding or inhibiting edge on each gasket for assisting in alignment prior to locking of two coupling members as described below. This ramped edge is any surface nonplanar with bottom surface 16 as is shown in two select embodiments in FIGS. 6 and 7. In the first embodiment as shown in FIG. 6, ramped edge 17 is a generally planar surface that is $\alpha°$ out of plane from bottom surface 16. In the second embodiment as shown in FIG. 7, ramped edge 17 changes slope in its midsection such that a first portion of ramped edge 17 that is adjacent bottom surface 16 is $\beta°$ out of plane from bottom surface 16 while a second portion of ramped edge 17 that is adjacent lower annular outer surface 20 flares even further and is $\gamma°$ out of plane from the first portion and thus $\beta°+\gamma°$ out of plane from bottom surface 16.

In one embodiment, $\alpha$ is 5°, while $\beta$ is 3° and $\gamma$ is 2°. The angles disclosed and the slope changing, stepping or lack thereof approach used to transition from bottom surface 16 to surface 20 are the best mode, however, the present invention contemplates that the ramped edge could be flared away from bottom surface 16 at any other angle or in any other stepped or slope changing manner such as with three different angles rather than one or two, or in a curved rather than a planar manner with or without multiple planes of differing slopes.

In one example, gasket 10 is designed and sized as follows. Hole 11 is 1.1875 inches wide. The diameter across gasket 10 at outer surface 21 is nominally 1.812 inches and ranges from a minimum of 1.796 inches to a maximum of 1.828 inches. The diameter across gasket 10 at base 24 in groove 19 is nominally 1.5 inches and ranges from a minimum of 1.484 inches to a maximum of 1.515 inches. The diameter across gasket 10 at outer surface 20 is nominally 2.062 inches and ranges from a minimum of 2.046 inches to a maximum of 2.078 inches. The diameter across the gasket 10 at lip 13 is nominally 1.398 inches and ranges from a minimum of 1.383 inches to a maximum of 1.413 inches. The height of gasket 10 from bottom surface 16 to top surface 12 is nominally 0.343 inch and ranges from a minimum of 0.341 inch to a maximum of 0.354 inch. The height of gasket 10 from bottom surface 16 to lip 13 is nominally 0.382 inch and ranges from a minimum of 0.380 inch to a maximum of 0.393 inch. The height of gasket 10 along outer surface 18 from top surface 12 to sloped upper side wall 22 is nominally 0.140 inches and ranges from a minimum of 0.135 inches to a maximum of 0.145 inches. The height of gasket 10 from top surface 12 to the intersection of base 23 and upper side wall 22 is nominally 0.171 inch and ranges from a minimum of 0.166 inch to a maximum of 0.176 inch. The height of gasket 10 from lower side wall 23 to bottom surface 16 is nominally 0.064 inch and ranges from a minimum of 0.060 inch to a maximum of 0.067 inch. The height of gasket 10 along outer surface 20 from lower side wall 23 to ramped edge 17 is nominally 0.054 inch and ranges from a minimum of 0.047 inch to a maximum of 0.0531.

The result of the wide sealing surface as dimensioned in this example is a sealing surface area of three to four times that of the prior art such as that shown in FIG. 8. Specifically, the surface area of the improved gasket of the present invention is approximately 2.2 to 2.3 in.$^2$ based upon the above example. In contrast, the same example without the improved wide sealing surface would have a width of the gasket across the bottom surface that is the same as the width across base 24 and would therefore have a surface area of 0.6 to 0.7 in.$^2$. This significant increase in surface area results in vastly improved sealing.

Preferably gasket 10 is molded from an elastomeric polymer, although gasket 10 may be molded from any material capable of forming a seal. In one embodiment, the gasket is butadiene rubber. In any embodiment, the material the gasket is made of may include an ozone inhibitor. Furthermore, in the preferred embodiment, the gasket is a rubber gasket with an ozone inhibitor where the rubber is a softer rubber such as one having a Shore A hardness in the range of 60 to 70 durometer, and preferably 65 durometer. This hardness range provides a softer rubber than the prior art (typically 70 to 80 Shore A hardness) thereby providing more supple in cold weather resulting in better sealing.

Gasket 10 is designed for use in air brake hose coupling members where adjacent gaskets in to-be-coupled coupling members are compressed in an abutting arrangement against each other to form a seal capable of holding under pneumatic pressures ranging from 60 to 90 or more p.s.i. This gasket is designed for use in any coupling member for this use which includes an annular groove for receiving the gasket.

One coupling member 40 in which gasket 10 is usable is shown in FIGS. 2–4 and incorporated by reference from U.S. Pat. No. 5,388,864 although as indicated above, gasket 10 is usable with any coupling member that employs compressed abutting and receives the gasket in an annular groove as described below. However for descriptive purposes, the gasket will be described with reference to the particular coupling member in this incorporated reference so that a description of assembly and use of gasket 10 is complete.

Coupling member 40 has a tubular neck 41 which is connected to a usual flexible pneumatic pressure hose (not shown) of a railroad car braking system and a tubular body 42, as shown in FIG. 3. Tubular body 42 has a bore 43 which terminates at an inner coupling face 44 (FIG. 3) which is generally flat and has an annular configuration and is located on a generally circular body portion 45 of body 42. The plane of coupling face 44 is generally parallel with the axis of the bore extending through body 42 and neck 41, as can be seen in FIG. 2.

As is disclosed in detail in incorporated U.S. Pat. No. 5,388,864, the front portion of tubular body 42 terminates in an arcuate flanged body portion 46 which has a curved front surface and a curved flat top surface. An arcuate flange, generally indicated at 47, projects outwardly from body 42 and extends in a generally circular fashion generally concentric with and spaced below the arcuate front surface. Flange 47 also includes an arcuate-shaped end locking lug 48 which projects outwardly from body 42 and terminates in a raised rounded lip 49. Lip 49 projects outwardly from lug 48 in a direction away from coupling face 44, as shown in FIG. 2.

A stop member is formed on body 42 and projects outwardly from the top portion thereof, and is formed with a notch therein. As detailed in incorporated U.S. Pat. No. 5,388,864, stop and notch limit the rotational movement of a pair of mated coupling members, that is a pair of coupling members where the gaskets are in compressed abutting relationship.

An L-shaped annular flange, indicated generally at 52 (FIG. 2), extends laterally outward from body 42 and has a leg 53 which extends forwardly in a generally parallel relationship with body 42. Flange 52 cooperates with locking lug 48 of the mating coupling member, and vice versa, to couple a pair of members together. Flange 52 includes an arcuate lip 54 which projects toward coupling face 44 and interlocks with lip 49 of flange 47 of a corresponding coupling member when the two coupling members are rotatably connected together.

An annular recess 55 (FIG. 4) is formed in body 42 about bore 43 adjacent coupling face 44, for receiving sealing gasket 10 therein. Recess 55 is either a square cut groove where opposing sides are parallel and radially extend from the bore axis, or alternatively is a sloped cut groove that includes at least one side that converges toward the other as the sides extend radially outward (as is shown in FIG. 4).

In operation, the gasket, when installed, flexes, bends and twists sufficiently such that head 30 is forced into bore 43 which is substantially the same size as neck 31. Once gasket 10 is inserted far enough into bore 43 that head 30 aligns with annular recess 55, head 30 snuggle seats in recess 55 as shown in FIG. 4 thereby providing a tight seal between gasket 10 and body 42 that is sufficient to stand at least 90 p.s.i.

In accordance with the invention, gasket 10, when seated in recess 55, extends out of bore 43 and flange 32 extends radially away from bore 43 outwardly over face 44, as shown in FIG. 4. Flange 32 provides a large sealing surface 60 for improved sealing with an abutted gasket. In addition, flange 32 which extends out over face 44 has extra support when abutted against another gasket due to lower side wall 23 resting against rigid face 44. Finally, the ramped edge 17 provides for better alignment when sealing with another gasket on another coupling member.

When two adjacent train cars have been coupled, the air brake hose lines of the adjacent cars must also be coupled. Hose sections (not shown) which connect to neck 41 extend outwardly from the ends of adjacent railroad cars, and are connected to the appropriate air lines and associated brake equipment mounted on the cars. The coupling member 40 is attached to the end of each of the hoses and is located generally under the mechanical coupler mechanism of the railroad car so that a trainman can easily grasp members 40 which are supported by a separate chain or other device connected to the train car to provide support. In a usual air brake hose coupling procedure, a trainman will grasp a pair of adjacent coupling members 40, one in each hand, and bend the hose ends upwardly and toward each other so that members 40 are in an adjacent position. The coupling faces 44 are then moved together, bringing gaskets 10 into an abutting compressed relationship with respect to each other. The ramped edge 17 assists in this alignment process by providing a gentle surface that is ramped, beveled, sloped, or otherwise not planar with bottom surface 16 so as to allow the gaskets to be slowly forced into abutting engagement as well as alignment.

Once the gaskets of adjacent coupling members are abutted, then the coupling members are rotated downward which interengages mating flanges and lugs extending from the coupling members. This holds the gaskets in a tight abutting relationship capable of not leaking at 90 or more p.s.i. The large sealing surface 60 on gasket 10 assures that the abutted gaskets will not leak at the 90 or more p.s.i. This assurance comes from the additional surface area contact provide by two large sealing surfaces being in compressed abutting relationship.

Tests have been performed to compare gaskets made under the standard prior art design as shown in FIG. 8 in comparison to the improved gasket of FIGS. 1, and 4–7. In one test arrangement, the prior art gasket and improved gasket 10 were dimensioned as indicated above in the example except that the prior art gasket did not include (1) flange 32 or (2) any beveled edges on flange 32 or the bottom surface 16, and in addition (3) had a lesser neck thickness than the nominal 0.156 inch. Thus, in general both gaskets had 1.1875 inches wide center holes with 1.812 nominal overall diameter and so forth.

The results of these tests include an increased surface area based upon the addition of flange 32. This increased surface area is of the magnitude of 200% or more. The additional surface area supplies additional resistance to pull apart between two abutting gaskets. All of the improvements resulting in an increased pull apart resistance of approximately four times. Specifically, the gasket with the increased surface area has been found to resist pull apart up to approximately 1400 foot-pounds at 90 p.s.i. in comparison to approximately 400 to 600 foot-pounds at 90 p.s.i. in the prior art.

Overall, the improvements of the present invention includes (1) adding a flange 32 which extends outward from the gasket and provides a large surface area, (2) beveling the edge of the bottom surface to allow improvement alignment, and (3) increasing the neck thickness, all of which function to supply significant additional resistance to pulling apart of two abutting gaskets. This increased resistance is of the magnitude of 2 to 3 times more force required to separate two mated couplings (force of approximately 1400 foot-pounds is needed rather than the previously required 400 to 600 foot-pounds). This increased resistance and improved alignment allows a softer rubber to be used, specifically a rubber with a Shore A hardness of less than 70 durometer and in the range of 60 to 70 in comparison to the prior art at 70 to 80. This softer rubber improves cold weather sealing because the gasket is more supple.

Accordingly, the improved gasket for use with an air brake hose coupling member is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved gasket for use with an air brake hose coupling member is constructed and used, the characteristics of the construction, and the advantageous, new and useful results obtained; the new and useful structures, devices, elements, arrangements, parts and combinations, are set forth in the appended claims.

What is claimed is:

1. An improved air brake hose coupling member having a generally tubular body with a neck at one end adapted to be connected to an air hose, an arcuate flange projected outwardly from the other end of the body for interlocking with a second air brake hose coupling member, and a bore having a bore diameter and extending through the generally tubular body from the flange to the neck and including a bore and a recess at the flange thereof, the improvement comprising a gasket insertable within the recess which is sealable with a similar gasket in the second air brake hose coupling member, the gasket having a tubular body with a flange having a tapered edge stepped into a first tapered region and a second tapered region for abutting a gasket on the second air brake hose coupling member and extending radially outward therefrom and having an outer diameter exceeding the bore diameter.

2. The improved air brake hose coupling member as set forth in claim 1 wherein the flange includes a planar surface with a tapered edge for abutting the gasket on the second air brake hose coupling.

3. The improved air brake hose coupling member as set forth in claim 2 wherein the tapered edge is 5 degrees out of plane with the planar surface.

4. The improved air brake hose coupling member as set forth in claim 3 wherein the tapered edge is stepped into a first tapered region and a second tapered region.

5. The improved air brake hose coupling member as set forth in claim 4 wherein the first tapered region is 3 degrees out of plane with the planar surface and the second tapered region is 2 degrees out of plane with the first tapered region.

6. The improved air brake hose coupling member as set forth in claim 1 wherein the gasket has a mating surface which abuts the gasket of a second air brake hose coupling member where an area of the mating surface exceeds one square inch.

7. The improved air brake hose coupling member as set forth in claim 6 wherein the mating surface area exceeds two square inches.

* * * * *